(12) United States Patent
Guyatt (10) Patent No.: US 11,618,176 B2
(45) Date of Patent: Apr. 4, 2023

(54) MULTIFUNCTION FOOD SLICER

(71) Applicant: Sunbeam Products, Inc., Boca Raton, FL (US)

(72) Inventor: Maxim Guyatt, Botany (AU)

(73) Assignee: Sunbeam Products, Inc., Boca Raton (Fl)

( * ) Notice: Subject to any disclaimer, the term of this patent is extended or adjusted under 35 U.S.C. 154(b) by 0 days.

(21) Appl. No.: 16/844,508

(22) Filed: Apr. 9, 2020

(65) Prior Publication Data

US 2020/0324427 A1 Oct. 15, 2020

Related U.S. Application Data

(60) Provisional application No. 62/832,735, filed on Apr. 11, 2019.

(51) Int. Cl.
| | | |
|---|---|---|
| *B26D 1/147* | (2006.01) | |
| *B26D 1/00* | (2006.01) | |
| *B26D 3/22* | (2006.01) | |
| *A47J 43/25* | (2006.01) | |
| *B26D 11/00* | (2006.01) | |

(52) U.S. Cl.
CPC ............ *B26D 1/147* (2013.01); *B26D 1/0006* (2013.01); *B26D 3/225* (2013.01); *A47J 43/255* (2013.01); *B26D 2001/0046* (2013.01); *B26D 2011/005* (2013.01); *B26D 2210/02* (2013.01)

(58) Field of Classification Search
CPC ....... A47J 43/0722; A47J 43/255; B26D 3/22; B26D 3/225

USPC .................................................. 241/92, 296
See application file for complete search history.

(56) References Cited

U.S. PATENT DOCUMENTS

| | | | | |
|---|---|---|---|---|
| 4,199,112 A | * | 4/1980 | McLean ................... | A47J 43/06 241/273.2 |
| 4,367,667 A | * | 1/1983 | Shibata .................... | B26D 3/22 83/356.3 |
| 4,560,111 A | * | 12/1985 | Cavalli .................... | B26D 3/22 241/282.2 |
| 5,992,287 A | * | 11/1999 | Dube ....................... | B26D 3/11 241/282.2 |
| 8,439,285 B2 | * | 5/2013 | Beber et al. ......... | B26D 7/2628 241/92 |
| 2003/0226923 A1 | * | 12/2003 | Starr et al. ............ | A47J 43/046 241/282.1 |
| 2011/0139017 A1 | * | 6/2011 | Beber et al. .......... | A47J 43/085 99/537 |
| 2011/0265664 A1 | * | 11/2011 | Goncalves et al. .. | A47J 43/0716 99/538 |

(Continued)

*Primary Examiner* — Evan H MacFarlane
*Assistant Examiner* — Liang Dong
(74) *Attorney, Agent, or Firm* — Husch Blackwell LLP (57) ABSTRACT

A food processor is provided that includes necessary blades and plates to carry out multiple functions of the food processor including slicing, shredding, and grating without having to remove and replace blades and plates to carry out those same functions. The motor of the food processor may operate in either the clockwise or counterclockwise direction. In the clockwise direction, the blades and plates within the cutting chamber may be configured to slice food at variable thicknesses, cut food at variable sizes in a julienne style, or grate food at various thicknesses. In the counterclockwise direction, food may be diced.

20 Claims, 11 Drawing Sheets

(56) References Cited

U.S. PATENT DOCUMENTS

| | | | |
|---|---|---|---|
| 2011/0265665 A1* | 11/2011 | Goncalves et al. .. | B26D 7/2628 |
| | | | 99/538 |
| 2014/0061344 A1* | 3/2014 | Conti et al. ......... | A47J 43/0722 |
| | | | 241/100 |
| 2017/0020339 A1* | 1/2017 | Allen et al. .......... | B26D 7/0641 |

* cited by examiner

MULTIFUNCTION FOOD SLICER

CROSS-REFERENCE TO RELATED APPLICATIONS

This application claims priority to U.S. Provisional Patent Application Ser. No. 62/832,735, filed on Apr. 11, 2019, entitled "MULTIFUNCTION FOOD SLICER", the entire disclosure of which is incorporated herein by reference.

FIELD OF INVENTION

The present invention relates generally to a kitchen appliance, and more particularly, to a food processor for slicing, chopping, dicing, shredding, grating, and French-fry- or julienne-style cutting various food products.

BACKGROUND OF INVENTION

Within the field of food processor appliances, and particularly appliances operable for food slicing, shredding and grating (collectively referred to herein as "food slicers"), there are multiple known weaknesses inherent to the usual system architecture and appliance design. For example, many of the food slicers currently on the market have multiple different blade sets that need to be fitted into the machine separately to achieve the different processing functions such as slicing, grating, dicing, etc.

Further, a different processing disc is usually needed for coarse grating, fine grating, shaving, thick julienne, thin julienne, and the like. Thus, a user must go through the time-consuming process of removing the lid to access and replace the disc or blade. This is also messy and places the users hand in contact with parts and surfaces that come in direct contact with the food, and as such, can be a hygiene and safety risk. Some attempts have been made to address this, such as the processor described in U.S. Pat. Pub. No. 2017/0020339 titled "Food Processor with Slice Selector Disc." That processor, however, has limited adjustability within the described implementation—namely the size of dice cubes, julienne strips, and grate size. Such implementations are limited only to a single size of cut food output.

For food slicers that do have adjustable thickness slicing blades, most still require the user to open the lid and remove the blade assembly to access the thickness adjustment controls on the blade assembly. Again, this is time consuming, messy, unhygienic, and potentially dangerous. Known solutions that allow external control of slicing thickness (e.g., U.S. Pat. Pub. No. 2011/0139017 titled "Food Processor with an External Control for Adjusting Cutting Thickness") have limited functionality beyond the simple slicing function.

SUMMARY OF THE INVENTION

The present invention provides a food processor defined by an inlet feed chute at the top of its lid and a cutting chamber positioned below the inlet chute. The cutting chamber includes necessary blades and plates to carry out the multiple functions of the food processor including, but not limited to, slicing, shredding, and grating. The cutting chamber also may include an ejection chute where food processed by the cutting chamber may be collected for subsequent use. In some embodiments, it may also include a bowl below the cutting chamber for receiving and collecting food product that has been processed.

A housing assembly is preferably located below the cutting chamber that includes the motor, drive, and gearbox and function selection mechanism assembly. In at least one embodiment, the function selection mechanism assembly may be provided as a dial by which the operator may select a function such as slice, shred, grate, etc.

The motor of the food processor may operate in either the clockwise or counterclockwise direction. In the clockwise direction, the blades and plates within the cutting chamber may be configured to slice food at variable thicknesses, cut food at variable sizes in a julienne style, or grate food at various thicknesses. In the counterclockwise direction, food may be diced. The mechanical components that work together at the direction of the function selection mechanism to carry out the various processing functions are described in greater detail herein below.

DESCRIPTION OF THE DRAWINGS

For a better understanding of the various embodiments of the present invention, reference may be made to the accompanying drawings in which.

While the disclosure is susceptible to various modifications and alternative forms, a specific embodiment thereof is shown by way of example in the drawings and will herein be described in detail. It should be understood, however, that the drawings and detailed description presented herein are not intended to limit the disclosure to the particular embodiment disclosed, but to the contrary, the intention is to cover all modifications, equivalents, and alternatives falling within the spirit and scope of the present disclosure as defined by the appended claims.

DETAILED DESCRIPTION OF THE INVENTION

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

Figure 1:
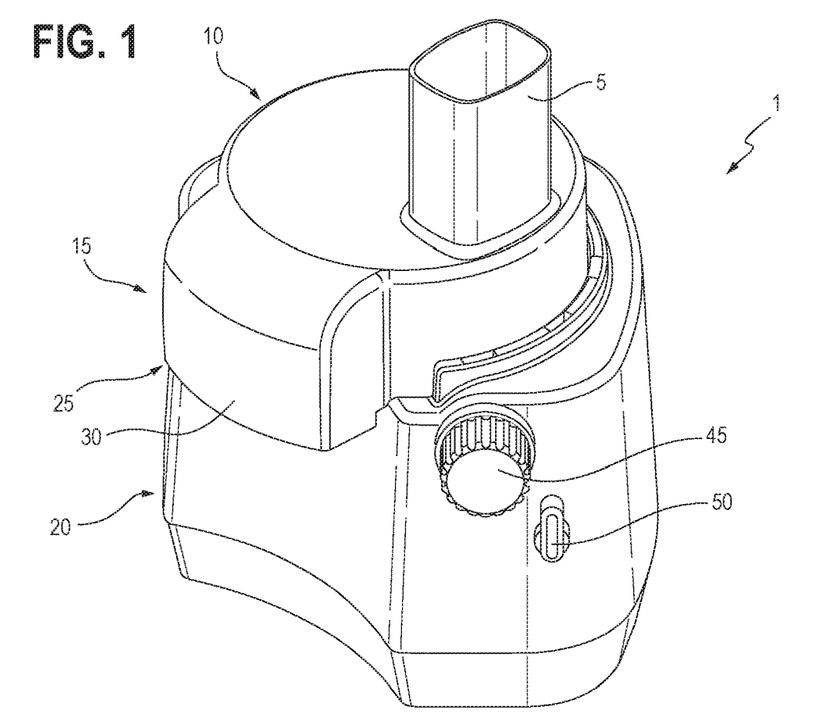
FIG. 1 is a perspective view of a multifunction food slicer constructed according to the teachings of the present invention.
Figure 2:
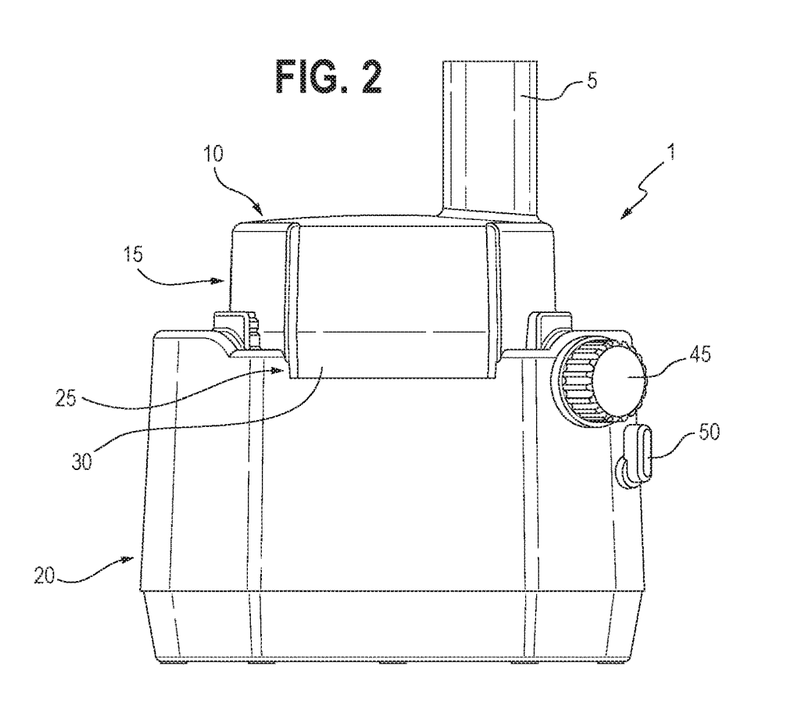
FIG. 2 is an elevation view of the food slicer of FIG. 1.
Figure 3:
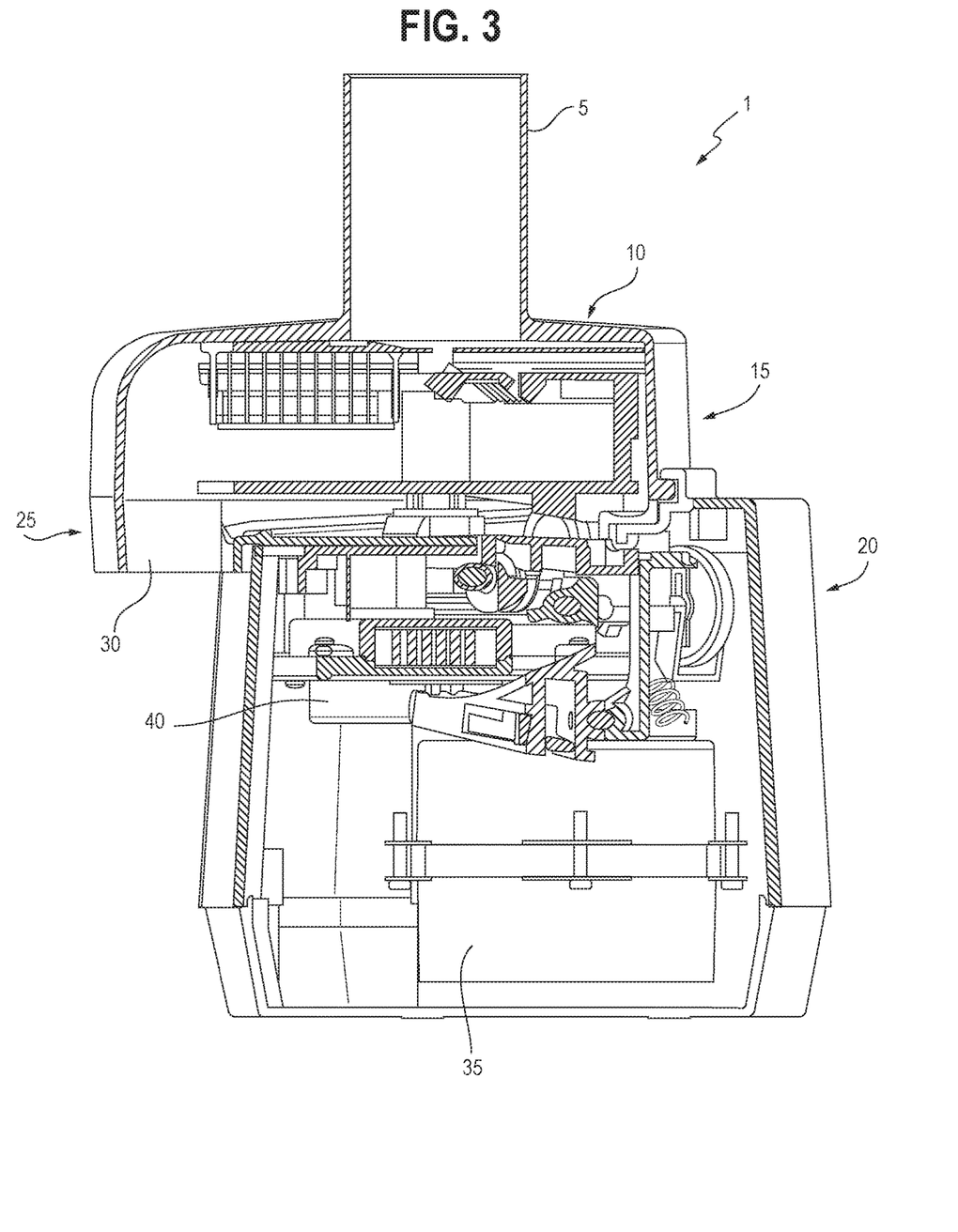
FIG. 3 is a cross-section view of the food slicer of FIGS. 1 and 2.

Referring now to the drawings, FIGS. 1-3 illustrate a multifunction food slicer 1 for slicing, shredding, grating, and dicing food at various thicknesses. The food slicer 1 includes an inlet feed chute 5 extending upwardly from a lid 10 through which food may be inserted when the slicer 1 is in use. The slicer 1 preferably includes each of a cutting chamber 15 and a mechanical housing assembly 20 that are selectively engageable with one another. Each of the cutting chamber 15 and the housing assembly 20 are preferably accessible for cleaning and occasional maintenance. The lid 10 may define the top of the cutting chamber 15.

The cutting chamber 15 may include various slicing, dicing, and grating blades that are described in greater detail below. The cutting chamber 15 also may include near its lower portion 25 an outlet ejection chute 30 through which food that has been processed by one or more of the blades within the cutting chamber 15 may be ejected into a bowl or the like. The ejection chute 30 is preferably located on the peripheral lower edge of the cutting chamber 15 so that it may easily be placed above a bowl or other container for collecting the processed food. In alternative embodiments, the slicer 1 may be outfitted with a bowl that may be selectively engageable with the cutting chamber 15 for collecting food processed within the cutting chamber 15.

The mechanical housing assembly 20 includes the motor 35, drive and gearbox 40 (illustrated in FIG. 3) used to operate the blades and plates in the cutting chamber 15. The housing assembly 20 also preferably includes the function selection mechanism 45, illustrated n FIGS. 1 and 2. The function selection mechanism 45 is illustrated in FIGS. 1 and 2 as a selection dial 45. The selection dial 45 is preferably external to the housing assembly 20 and may be in mechanical connection (though electronic or other connection types are foreseeable) with the components within the mechanical housing assembly 20 (like the motor 35, drive, and gearbox 40). The selection dial 45 may be controlled by an operator to instruct the blades and/or plates to move and/or operate in various ways to carry out various processing functions, all using the same control mechanism (though in some embodiments multiple control mechanisms like the dial 45 may be provided). Particular movements of blades and/or plates are discussed in greater detail below to further describe the multiple functions the slicer 1 may execute. The housing assembly 20 may also include an on/off activation member 50 (e.g., switch, button, lever) which may be in electronic or mechanical connection with the motor 35 to turn the slicer 1 on or off.

Figure 4:
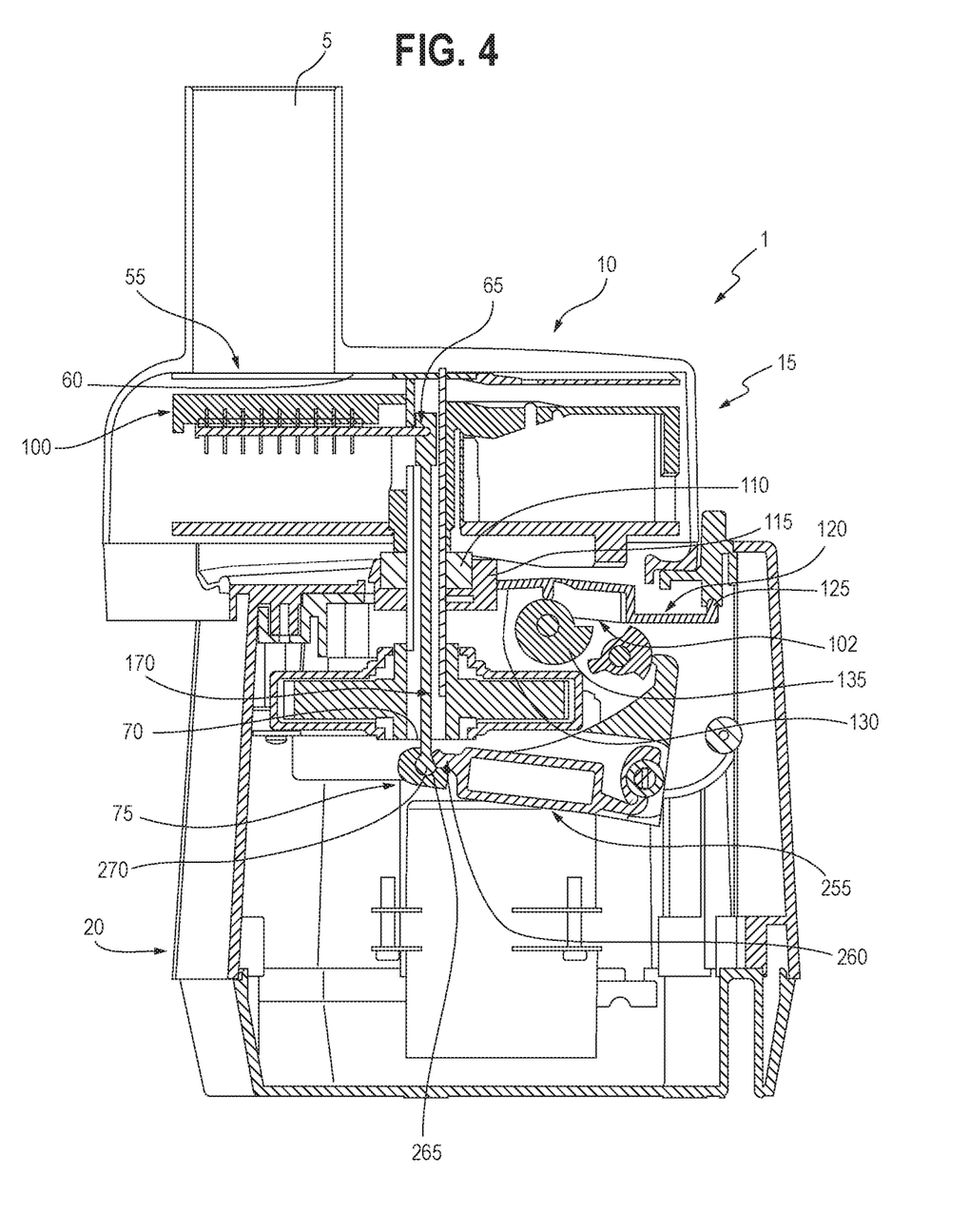
FIG. 4 is a second cross-section view of the food slicer of FIGS. 1-3.

Turning now to FIG. 4, a rotating slicing blade 55 is illustrated in cross-section. The slicing blade 55 is substantially horizontal and perpendicular to the food inlet feed chute 5. The blade 55 may positioned and located such that it is near an underside 60 of the lid 10. As such, when food enters the chute 5, it does not travel far before encountering the blade 55. The blade 55 is preferably affixed to a rotary shaft 65 having a vertical axis and located near or in the center of the cutting chamber 15. The lower vertical position of the shaft 65 and the blade 55 is limited by a stop-face shoulder 70 where the shaft 65 engages with a drive detail 75 in the mechanical housing 20, while the upper vertical position is limited by the lid 10. There is little to no vertical freedom for the blade 55 and shaft 65 because of the vertical constraints.

Figure 5:
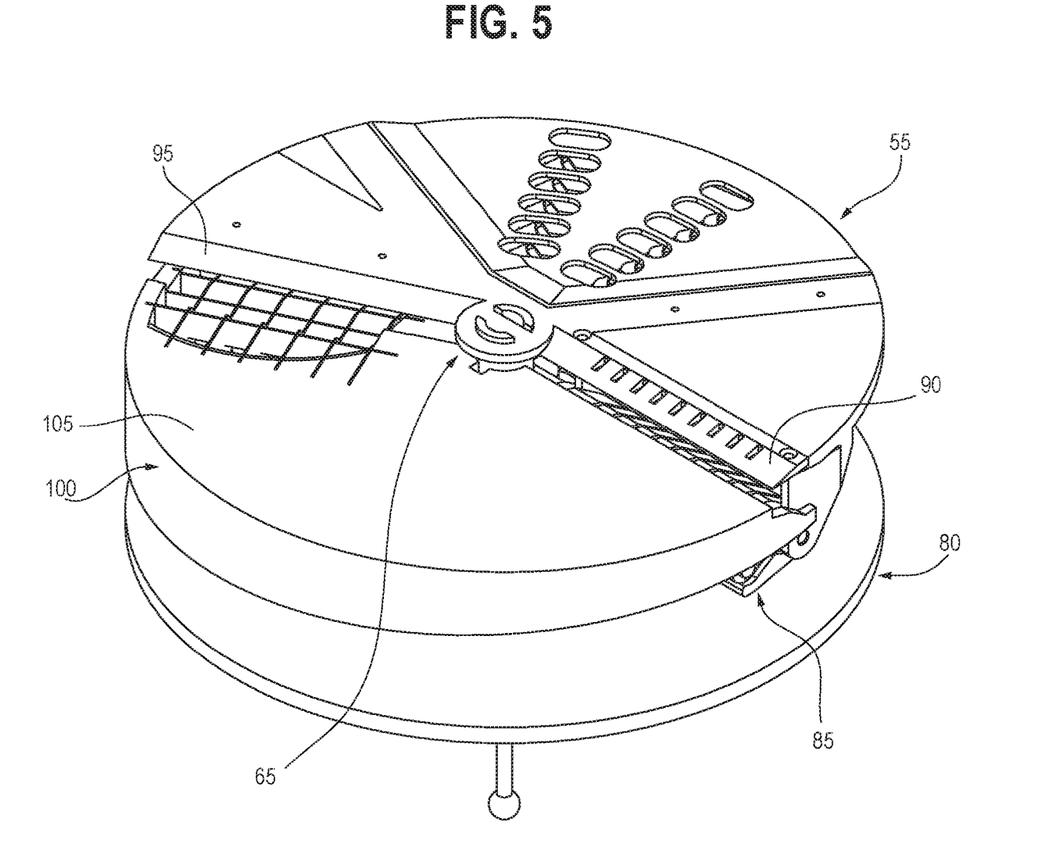
FIG. 5 is a perspective view of a rotating blade assembly and stop plate assembly of the food slicer of FIGS. 1-4.

The slicing blade 55 is illustrated in greater detail in FIG. 5, as is an ejector plate 80 positioned below the slicing blade 55. A vertical blade assembly 85 is also illustrated as engaged with the slicing blade 55. As will be described below, various combinations of the blade 55, ejector plate 80, and vertical blade assembly 85 working together perform the various food processing functions that the slicer 1 may execute.

The blade 55 has two sharp cutting edges 90, 95 that extend outwardly from the center shaft 65, largely on opposing sides of the vertical shaft axis. The sharp cutting edges 90, 95 of the blade 55 are such that the leading edge 90 of one side acts to cut when the shaft spins in the clockwise direction, while the opposing blade edge 95 is sharpened to cut in the counterclockwise direction. As will be described in more detail below, the clockwise cutting edge 90 is for slicing, French-fry (or julienne), and shredding, while the counterclockwise cutting edge 95 slices food to be diced in a corresponding next step.

A stop plate assembly 100 is preferably rotatably engaged with the center shaft 65 with spline-like drive details, but in other embodiments may be engaged by tabs in a mating slot or the like (not illustrated). The engagement should allow for vertical movement, such that the stop-plate assembly 100 rotates with the blade 55 but also can slide up and down vertically. A top surface 105 of the stop plate assembly 100 acts like a food stop face for food stuff that is fed into the cutting chamber 15 through the inlet chute 5. The relative position of the surface 105 to the blade edges 95, 100 defines the thickness of the food slices to be cut. A mechanism within the housing assembly 20 controls the height of the stop plate 100. In some embodiments, the stop plate assembly 100 and blade 55 may be infinitesimally adjusted relative to one another within a certain range so an infinite number of slice thickness options within a certain range can be achieved.

As set forth above, the housing assembly 20 contains a motor 35, a reduction gearbox 40, the function selection mechanism 45, and a thickness adjustment mechanism 102 in communication with the function selection mechanism 45. As illustrated at least partially in FIG. 4, the thickness adjustment mechanism 102 interfaces with the stop plate 100 via a thrust bearing 110 in a bearing housing 115. A lever linkage 120 has a first end 125 pivotally fixed within the housing and a second end 130 supporting the bearing housing 115. The lever linkage 120 has a protrusion on its underside (not illustrated) that cooperates with a cam 135 rotatably fixed within the housing 20 that vertically translates the height of the stop plate 100 and thus the thickness of the sliced food.

More particularly, the height of the stop plate 100 may be determined by the angular position of the thickness cam 135. The thickness cam 135 has an increasing radius as it is rotated clockwise (when viewed from the front of the appliance) going from the thickest slice thickness to the thinnest in just under one cam rotation. The thickness cam 135 is preferably directly actuated by the dial 45 mounted in the housing 20 such that an operator may select the slice thickness by turning the dial 45, though other control methods are envisioned. It should also be appreciated that non-mechanical connections including electronic communication may be used to actuate the stop plate 100 relative to the blade 55.

Figure 6:
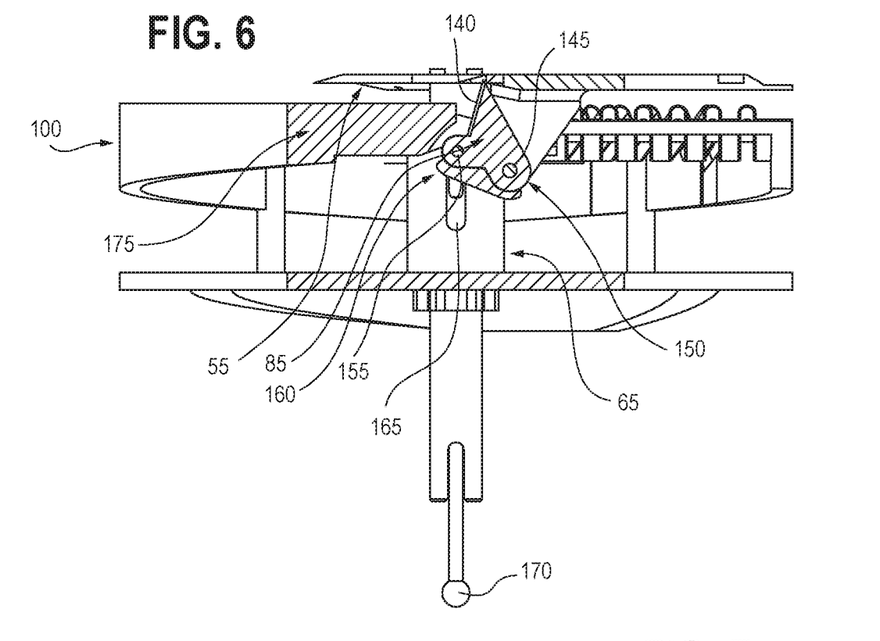
FIG. 6 is a cross-section view of the rotating blade assembly and stop plate assembly of FIG. 5.
Figure 7:
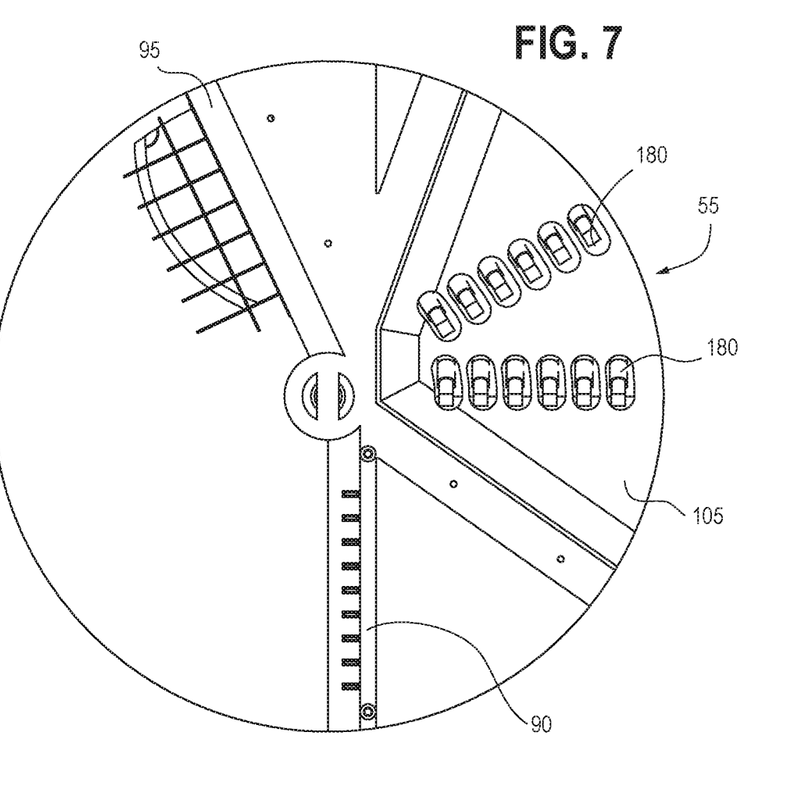
FIG. 7 is a top plan view of the rotating blade assembly and stop plate assembly of FIGS. 5 and 6.
Figure 8:
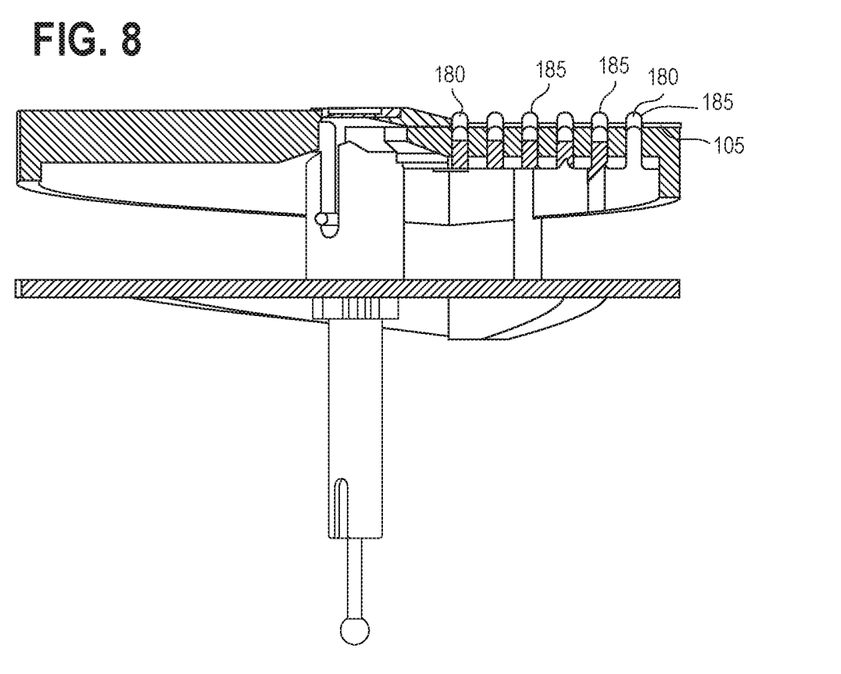
FIG. 8 is a second cross-section view of the rotating blade assembly and stop plate assembly of FIGS. 5-7.
Figure 9:
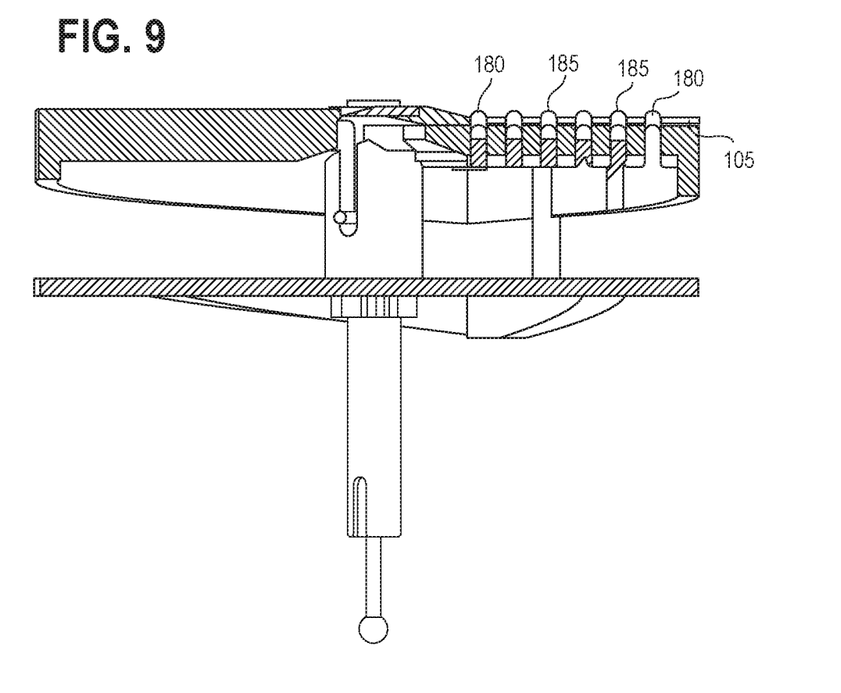
FIG. 9 is a third cross-section view of the rotating blade assembly and stop plate assembly of FIG. 5-8.

Turning to FIG. 6, the vertical blade assembly 85 may be mounted to the horizontal slicing blade 55 such that it may be used to achieve a julienne, French fry, or shred strip cut. Vertical blades 140 of the assembly 85 are preferably able to cut strips of variable thickness, depending on the thickness of the slice setting, which may be adjusted using the above-described mechanics. The vertical blades 140 preferably swivel on a horizontal pivot 145 mounted to the slicing blade 55. The pivot 145 may be on a trailing lower edge 150 of the vertical blades 140, while a linkage pin 155 at a lower leading edge 160 of the vertical blades 140 preferably acts through a slot 165 in the central blade shaft 65 to an actuation shaft 170.

The actuation shaft 170 may be instructed to raise or lower so as to engage or disengage the vertical blades 140 respectively such that they are vertically translated just below the slicing blade 55 while engaged, and lowered below the stop plate 100 while disengaged. When the vertical blades 140 are engaged, the sliced food is pushed through the vertical blades 140 to create strips from the slices created by the edge 90. When they are disengaged, the sliced food passes freely through the gap between the edge 90 and the vertical blades 140, and is not processed into strips but instead output to the outlet chute 30 as sliced, but not shredded, food.

A portion 175 of the stop plate 100 extends underneath the horizontal blade 55. Turning to FIGS. 7-12, approximately midway between the opposing leading edges 90, 95 of the horizontal slicing blade 55, an area of the slicing blade 55 has an array of holes 180 through the top surface 105. The stop plate 100 preferably includes an array of hooped blade protrusions 185 that align with the holes 180 and are positioned below those same holes 180. The hooped blade protrusions 185 may grate food that pass through the protrusions 185, and depending on the relative position of the stop plate 100 to the blade 55, a variety of grate sizes may be provided.

More particularly, when the stop plate 100 is raised to such a level that the grating blades 185 protrude through the holes 180 in the slicing blade 55, they are exposed to the food stuff fed through the inlet feed chute 5 from above. In a first instance, when the blade assembly 55 is rotating clockwise (when viewed from above) the grating blades 185 are below the top surface 105 of the slicing blade 55 when the slice thickness setting is between approximately 10 mm (thick slices) and approximately 1 mm (thin slices), and thus no grating takes place.

Figure 10:
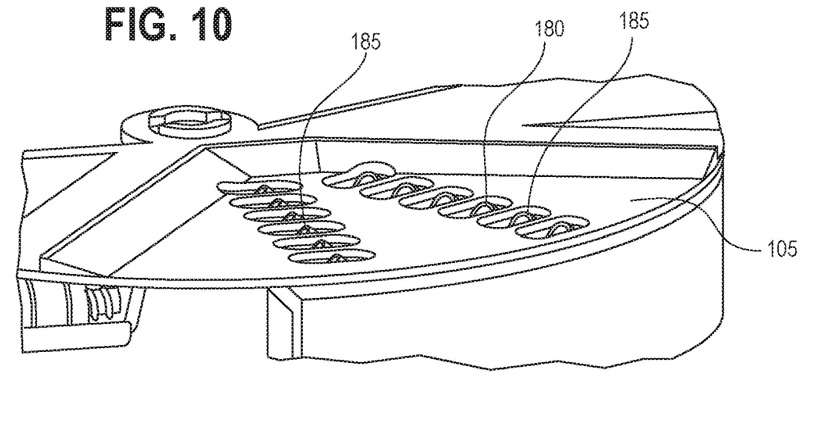
FIG. 10 is a partial perspective view of grate blades and grate holes of the food slicer in a first position.
Figure 11:
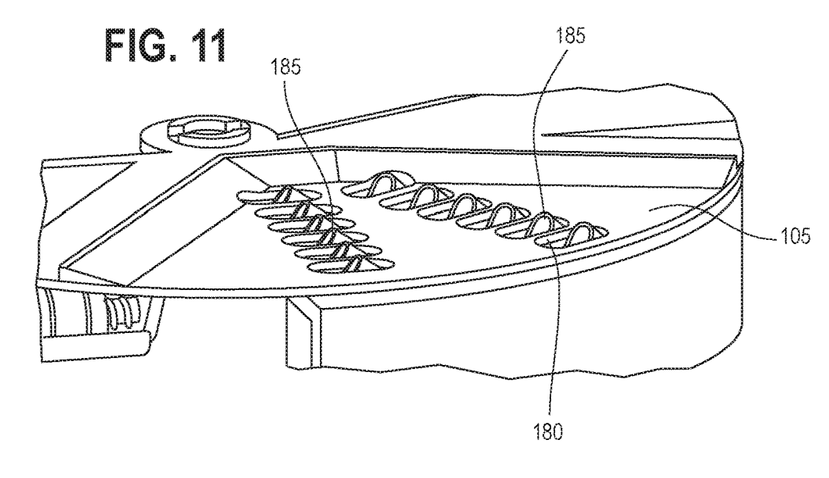
FIG. 11 is a partial perspective view of grate blades and grate holes of the food slicer in a second position.
Figure 12:
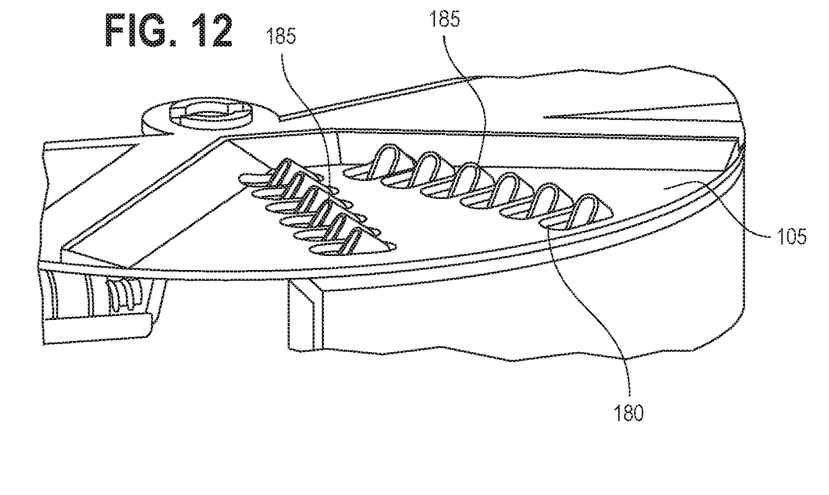
FIG. 12 is a partial perspective view of grate blades and grate holes of the food slicer in a third position.

However, in a second instance, when the stop plate 100 is raised beyond a slice thickness of zero (0 mm), the grating blades 185 protrude through the holes 180 to produce a grating (small strips approximately 3 mm×1 mm) output. In this position, the edge 90 and the stop plate 100 are abutting (or nearly abutting one another), so that food is not sliced by the edge 90 as it passes the edge 90. The stop plate 100 can preferably move farther, beyond zero thickness setting, so that it is approximately in the −1 mm to −4 mm range. In this range, the blades 185 extend farther and farther through the holes 180, thus increasing particle size, or increased coarseness output, for the grating function. The increase in distance between the blades 185 and holes 180 is illustrated in FIGS. 10-12 which show the increase in coarseness. To perform the grating function, the stop plate 100 may be vertically actuated in the same manner as described above for adjusting slice thickness.

As set forth above, the slicing blade 55 has two horizontal sharpened leading edges 90, 95. When rotating clockwise the edge 90 may produce variable thickness slices, variable thickness strips when the vertical blades are engaged, or variable particle size grating for "sub-zero" thickness settings. Moreover, as described in detail below, when the blade 55 is rotating counterclockwise, an additional function may be performed. More particularly, the edge 95 may create variable thickness diced output.

Figure 13:
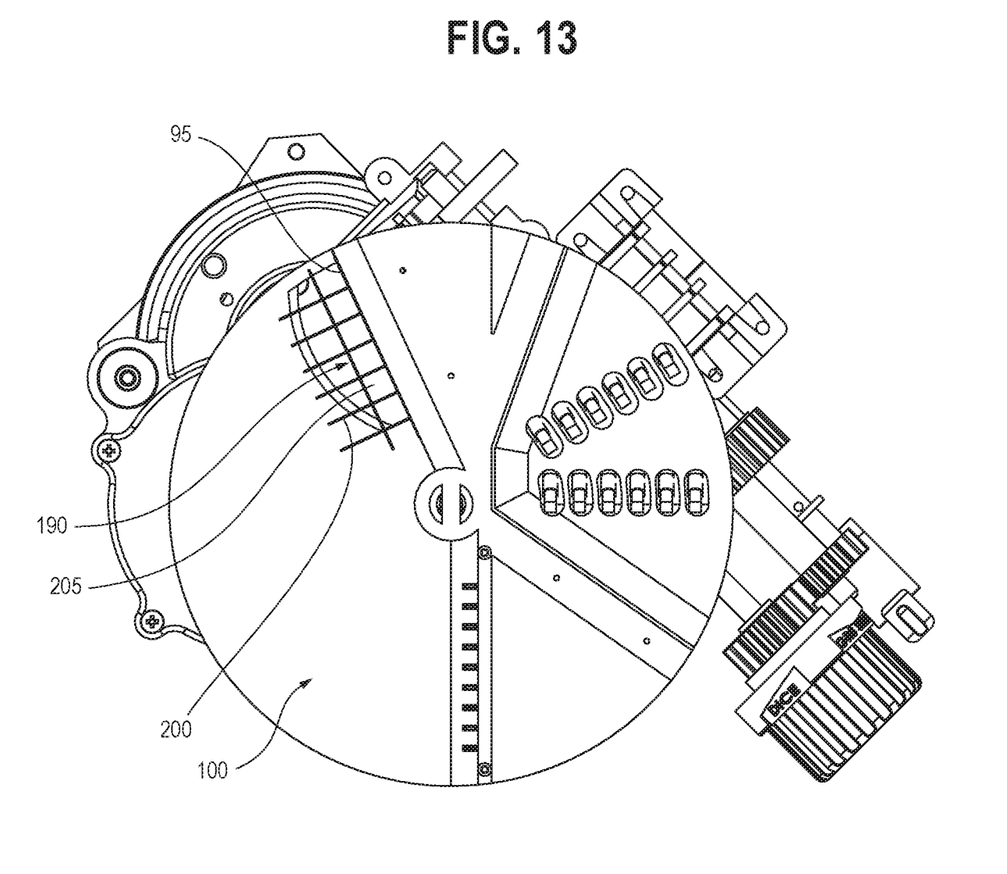
FIG. 13 is a plan view of the rotating blade assembly and various controls associated therewith of the food slicer.
Figure 14:
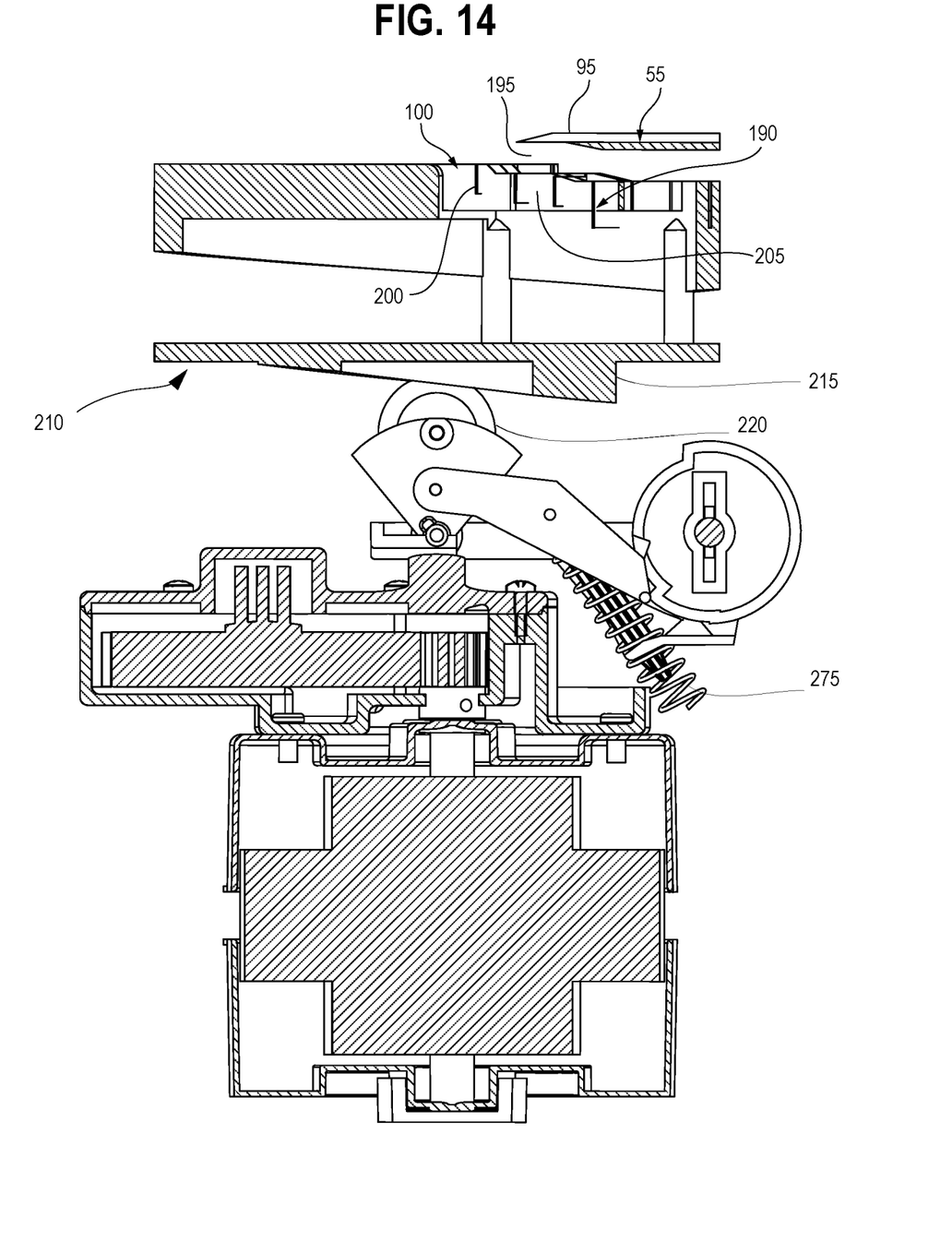
FIG. 14 is a cross-section view of the rotating blade assembly and various controls associated therewith of the food slicer.
Figure 15:
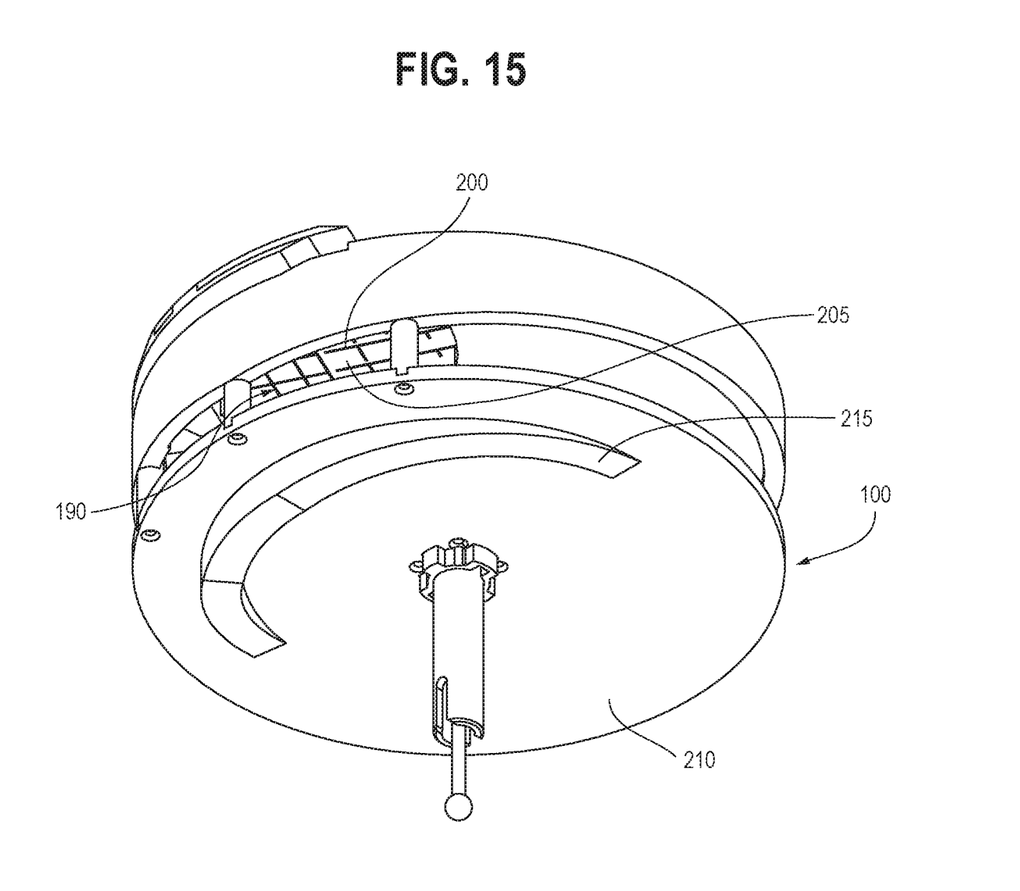
FIG. 15 is a perspective view of an underside of the stop plate assembly of the food slicer.

When the slicer 1 is set to its dicing function, the motor 35 is instructed to rotate the blade 55 in a counterclockwise direction. As provided in FIGS. 13-15, a dicing grid 190 of the stop plate 100 extends underneath the counterclockwise slicing edge 95. A gap 195 (see FIG. 14) is preferably provided between the stop plate 100 immediately adjacent to the slicing edge 95 and extending underneath the counterclockwise slicing edge 95. The gap 195 is positioned such that food that is sliced by the edge 95 falls through the gap 195 toward the dicing grid 190. The dicing grid 190 is preferably provided with a number of blade members 200 arranged in a grid pattern with a plurality of holes 205 in a square pattern between the blades 200. In the preferred embodiment the square size is 10 mm, to produce dice sizes 10 mm×10 mm×1-10 mm, the 1-10 mm range depending on the variably selectable slice thickness. Yet, in alternate embodiments, the grid array may be a user replaceable part whereby different grid sizes could be fitted to achieve different dice sizes. For example, an 8 mm×8 mm grid may be provided.

On an underside 210 (see FIG. 15) of the stop plate assembly 100, a cam ramp 215 extends downwardly from the underside 210 in a partial circular track. The cam ramp 215 extends downwardly approximately 14 mm, which may be equivalent to the maximum range of the thickness adjustment, in this embodiment, 10 mm+4 mm. In other embodiments, both the ramp depth and the thickness adjustment maximums may vary to known or foreseeable depths and thicknesses, respectively. The ramp 215 is illustrated as extending downwardly over approximately 180° of rotation and returning within 90° of rotation, though other profiles are envisioned.

Figure 16:
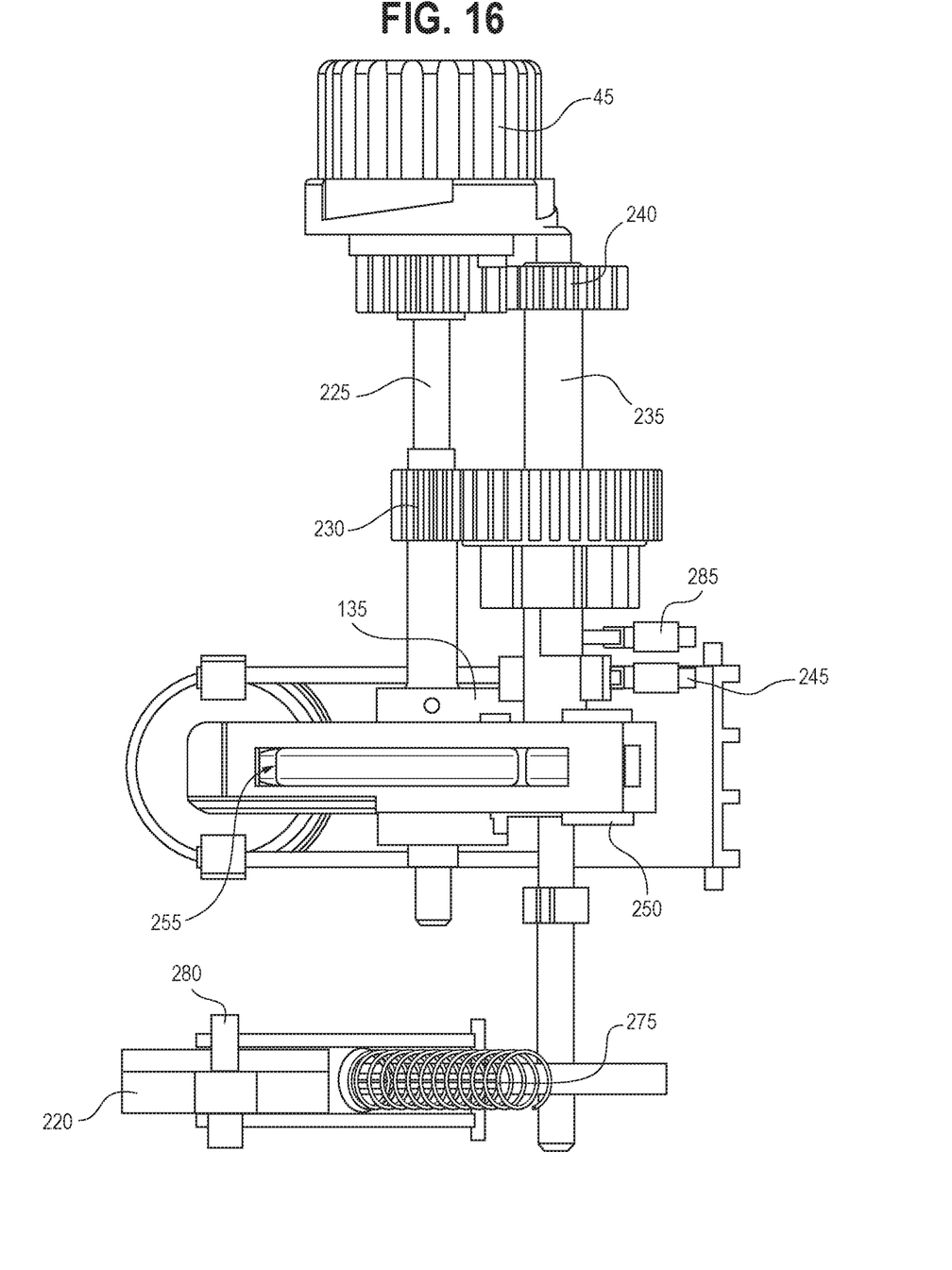
FIG. 16 is a cross-section plan view of various controls associated with the food slicer.

The mechanism within the mechanical housing assembly 20 by which various functions of the slicer 1 are controlled is illustrated in FIG. 16, including the dicing function. When the slicer 1 is set to dice, a dice lift wheel 220 is retractably mounted in alignment with the ramp 215 of the underside 210 of the stop plate assembly 100 (not illustrated). When the lift wheel 220 is engaged, it may act to lift the stop plate 100 to its maximum height and lower it again within one rotation. During the dicing operation, when the blade 55 rotates counterclockwise and the lift wheel 220 and ramp 215 are engaged, the below described sequence of events may take place. First, the sliced food falls onto the dicing grid 190 after it has been sliced by the edge 95. Then, the cam 135 may act to lift the stop plate 100 and dicing grid 190, thus squeezing the food between the underside of the slice blade 55 and the dicing grid 190, creating diced food output. The stop plate 100 may then return to the selected thickness setting. The complete dicing process happens over one rotation of the blade 55 and stop plate assembly 100, and upon the next rotation, another cycle is completed.

In order to operate the slicer 1 to take on any of the slicing, shredding, French-fry cutting (or julienne cutting), or dicing functions, the dial member 45 (or other foreseeable control mechanism) may be operated to put into motion the mechanics described above to carry out one of the functions of the slicer 1. In a preferred embodiment, the selection of the available features that control all functions and thickness settings are accessible through a single dial interface, the dial member 45.

As described above, the dial member 45 may be directly mechanically affixed to the thickness cam 135 by a shaft 225. Furthermore, the cam 135 may act to adjust the height of the stop plate 100, thus affecting the thickness of the food slices. The cam 135 increases in diameter through the full range of thickness adjustment, with approximately 270° of dial rotation. This gives the user a high level of resolution in selecting the desired thickness with the dial member 45.

A spur gear 230 mechanically fixed to the dial member 45 and thickness cam 135 may be engaged to a secondary shaft 235 and function select mechanism through a 3:1 reduction gear 240. The dial member 45 and thickness cam 135 may rotate three (3) complete rotations to achieve one (1) rotation of the function select shaft 235. The secondary (function select) shaft 235 includes various mechanical cams, ratchet stop faces and electrical microswitch activation cams that help set into motion the components that carry out an intended function.

In a preferred embodiment, the arrangement of the functions is: thick to thin slice (1st dial rotation), thick to thin french-fry, shred, small to large grate (2nd dial rotation), thick to thin dice (3rd dial rotation). Through the first 270° of rotation of the dial member 45, corresponding to the first 90° of the function shaft 235 (i.e., slice) a clockwise microswitch 245 is activated by a microswitch cam (not illustrated) on the function shaft 235. This enables the motor 35 to spin in the corresponding direction when activated with the control switch 50 when it is in an ON position.

Turning to the shred function, the function shaft 235 may include a shred activation cam 250 that has a lead-in transitional ramp (not illustrated) through the function shaft range 90°-120° (first dial rotation 270°-360°), and the shred activation is fully engaged through 120° to 210° (second dial rotation 0°-270°), as is the clockwise microswitch 245. A shred cam follower (not illustrated) may be mounted to a lever rocker 255, with a secondary lever-arm 260 that has a spherical socket 265 that captures a ball 270 feature on the base of the shredding actuation shaft 170 (see FIG. 4). The vertical shredding blade assembly 85 may be engaged through the actuation shaft 170 and shred cam rocker 255 according to the shred activation cam 250 on the function select shaft 235. The shred activation cam 250 may transition away within the 210°-240° function shaft angle.

Additionally, turning to the dice function, through the 210°-240° function shaft angle, a latching mechanism (not illustrated) releases the retractable dice wheel 220, which is biased upward with a spring member 275 into the engaged position. A dice wheel pivot 280 is positioned in such a way that the reactive downward force (resultant from lifting the stop plate 100 upward during dicing) does not act on the spring, but on the pivot 280 which is preferably very rigid. This positioning of the pivot 280 allows for a relatively light spring to deploy the dice lift wheel 220, and a relatively light force for the user to retract the mechanism again. The dice lift wheel 220 is fully engaged as is a counterclockwise microswitch 285, thus enabling the motor 35 to spin in the reverse direction when activated with the ON control 50. The dice wheel retraction may occur through the function shaft angle 330°-360°.

Thus, the slicer 1 set forth above is preferably able to carry out a number of food processing functions, preferably using only one control mechanism. The various mechanisms within the slicer 1 allow an operator to not only select the type of cut they want, but also the size of that cut. There is preferably no need for the operator to manually remove or install blades from the unit to carry out the various functions of the slicer 1, as the gears, cams, and other mechanical features are preferably sufficient to carry out the functions and vary the cuts and cut sizes.

From the foregoing, it will be seen that the various embodiments of the present invention are well adapted to attain all the objectives and advantages hereinabove set forth together with still other advantages which are obvious and which are inherent to the present structures. It will be understood that certain features and sub-combinations of the present embodiments are of utility and may be employed without reference to other features and sub-combinations. Since many possible embodiments of the present invention may be made without departing from the spirit and scope of the present invention, it is also to be understood that all disclosures herein set forth or illustrated in the accompanying drawings are to be interpreted as illustrative only and not limiting. The various constructions described above and illustrated in the drawings are presented by way of example only and are not intended to limit the concepts, principles and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required."

Many changes, modifications, variations and other uses and applications of the present constructions will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A multifunction food slicer for carrying out various food processing functions, the multifunction food slicer comprising:
   a rotary blade including each of a first blade edge and a second blade edge, wherein the first blade edge is configured to slice food when the rotary blade rotates in a first direction, and the second blade edge is configured to slice food when the rotary blade rotates in a second direction;
   a stop plate placed below the rotary blade, the stop plate including:
      a plurality of grate blades in substantial alignment with a plurality of grate holes located in the rotary blade, wherein the plurality of grate blades perform& a grating function when the rotary blade rotates in the first direction; and
      a dicing grid configured to operate with the second blade edge, wherein the dicing grid and the second blade edge perform a dicing operation when the rotary blade rotates in the second direction.

2. The multifunction food slicer of claim 1, wherein the multifunction food slicer includes a vertical blade assembly configured to operate with the first blade edge, wherein the vertical blade assembly and the first blade edge perform a slicing operation when the rotary blade rotates in the first direction.

3. The multifunction food slicer of claim 1, wherein the multifunction food slicer includes a function selection mechanism in mechanical connection with at least one of the rotary blade and the stop plate.

4. The multifunction food slicer of claim 1, wherein the plurality of grate blades are vertically adjustable relative to the plurality of grate holes such that grate thickness is adjustable.

5. The multifunction food slicer of claim 1, wherein the stop plate and the rotary blade are mechanically coupled to a shaft that extends through the multifunction food slicer.

6. The multifunction food slicer of claim 1, wherein the multifunction food slicer includes an inlet feed chute extending upwardly from a lid of the multifunction food slicer through which food is configured to be inserted.

7. The multifunction food slicer of claim 1, wherein the multifunction food slicer includes an outlet ejection chute through which food that has been processed within the multifunction food slicer is configured to be ejected.

8. A multifunction food slicer for carrying out various food processing functions, the multifunction food slicer comprising:
   a rotary blade including each of a first blade edge and a second blade edge, wherein the first blade edge is configured to slice food when the rotary blade rotates in a first direction, and the second blade edge is configured to slice food when the rotary blade rotates in a second direction;
   a stop plate placed below the rotary blade, the stop plate including a plurality of grate blades in substantial alignment with a plurality of grate holes located in the rotary blade, wherein the plurality of grate blades performs a grating function when the rotary blade rotates in the first direction; and
   a vertical blade assembly configured to operate with the first blade edge, wherein the vertical blade assembly and the first blade edge perform a slicing operation when the rotary blade rotates in the first direction.

9. The food processor of claim 8, wherein the stop plate includes a dicing grid that may operate with the second blade edge, wherein the dicing grid and the second blade edge may perform a dicing operation when the rotary blade rotates in the second direction.

10. The multifunction food slicer of claim 8, wherein the multifunction food slicer includes a function selection mechanism in mechanical connection with at least one of the rotary blade and the stop plate.

11. The food processor of claim 8, wherein the plurality of grate blades are vertically adjustable relative to the plurality of grate holes such that grate thickness is adjustable.

12. The multifunction food slicer of claim 8, wherein the stop plate and the rotary blade are mechanically coupled to a shaft that extends through the food processor.

13. The multifunction food slicer of claim 8, wherein the multifunction food slicer an inlet feed chute extending upwardly from a lid of the multifunction food slicer through which food is configured to be inserted.

14. The multifunction food slicer of claim 8, wherein the multifunction food slicer includes an outlet ejection chute through which food that has been processed within the multifunction food slicer is configured to be ejected.

15. A multifunction food slicer for carrying out various food processing functions, the multifunction food slicer comprising:
   a rotary blade including each of a first blade edge and a second blade edge, wherein the first blade edge is configured to slice food when the rotary blade rotates in a first direction, and the second blade edge is configured to slice food when the rotary blade rotates in a second direction;
   a stop plate placed below the rotary blade, the stop plate including a dicing grid configured to operate with the second blade edge, wherein the dicing grid and the second blade edge perform a dicing operation when the rotary blade rotates in the second direction; and
   a vertical blade assembly that may operate with the first blade edge, wherein the vertical blade assembly and the first blade edge may perform a slicing operation when the rotary blade rotates in the first direction.

16. The multifunction food slicer of claim 15, wherein the stop plate includes a plurality of grate blades in substantial alignment with a plurality of grate holes located in the rotary blade, wherein the plurality of grate blades perform a grating function when the rotary blade rotates in the first direction.

17. The multifunction food slicer of claim 15, wherein the multifunction food slicer includes a function selection mechanism in mechanical connection with at least one of the rotary blade and the stop plate.

18. The multifunction food slicer of claim 15, wherein the plurality of grate blades are vertically adjustable relative to the plurality of grate holes such that grate thickness is adjustable.

19. The multifunction food slicer of claim 15, wherein the stop plate and the rotary blade are mechanically coupled to a shaft that extends through the multifunction food slicer.

20. The multifunction food slicer of claim 15, wherein the multifunction food slicer includes an inlet feed chute extending upwardly from a lid of the multifunction food slicer through which food is configured to be inserted.

* * * * *